March 4, 1924.
H. C. SCHAPER
WEIGHING SCALE
Filed Jan. 12, 1921
1,485,470
2 Sheets-Sheet 1
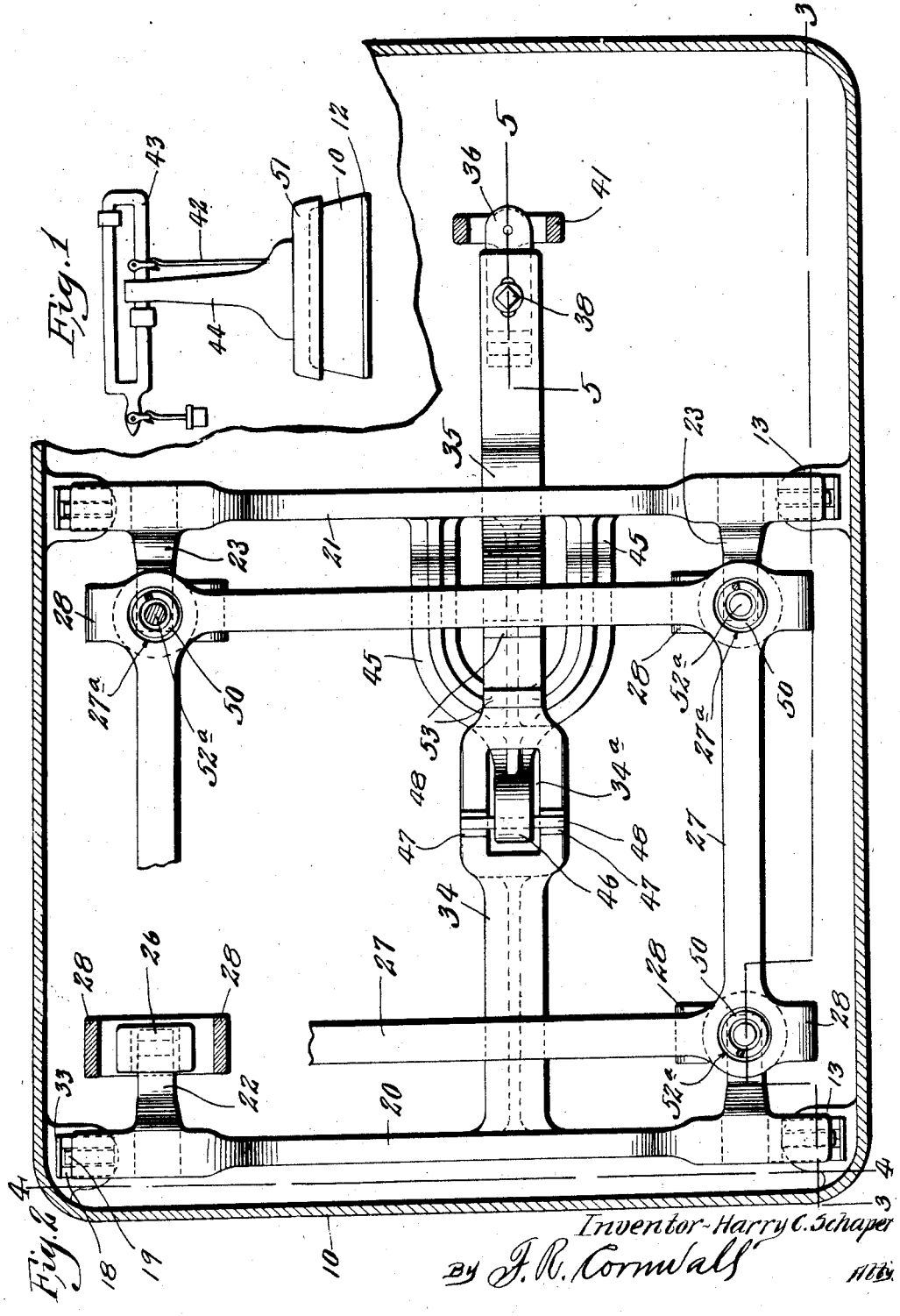
Inventor- Harry C. Schaper
By J. R. Cornwall
Atty.

March 4, 1924.
H. C. SCHAPER
WEIGHING SCALE
Filed Jan. 12, 1921
1,485,470
2 Sheets-Sheet 2
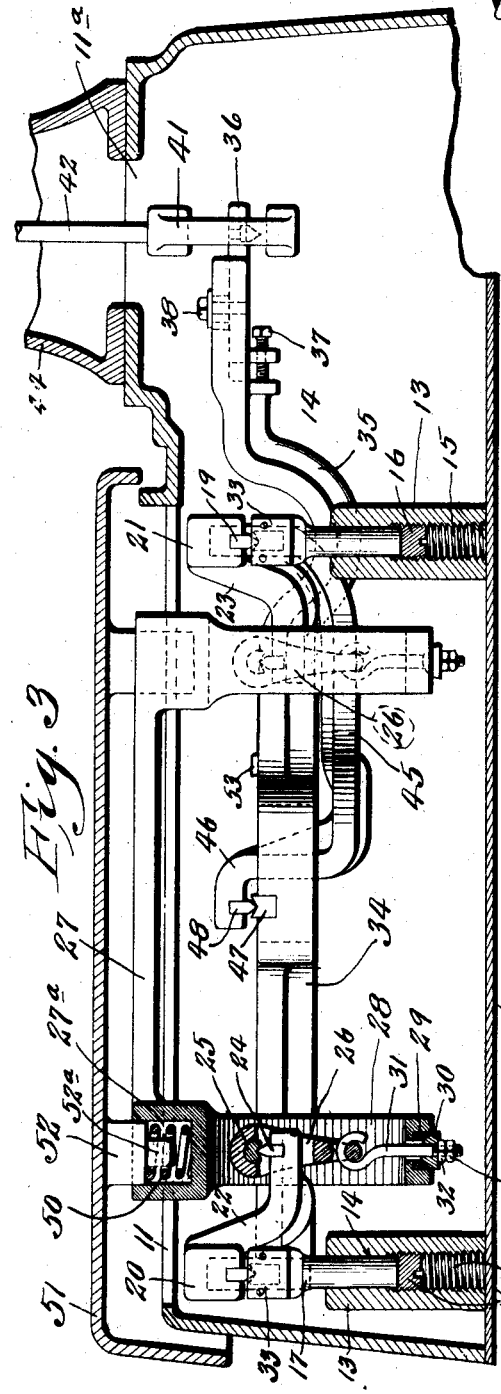
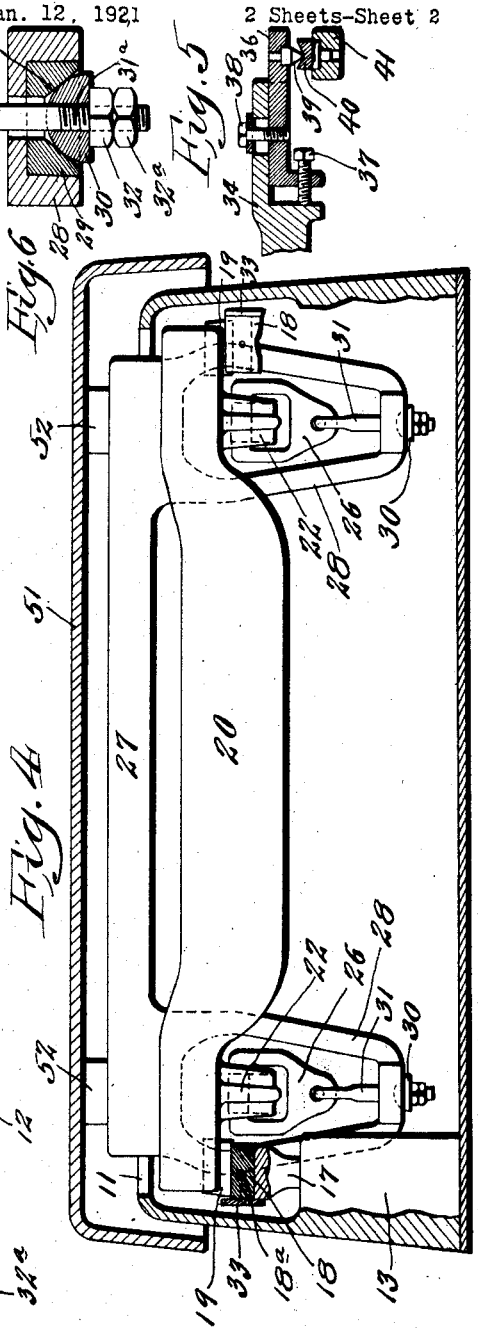
Inventor
Harry C. Schaper
By J. R. Cornwall, Atty.

Patented Mar. 4, 1924.

1,485,470

UNITED STATES PATENT OFFICE.

HARRY C. SCHAPER, OF ST. LOUIS, MISSOURI, ASSIGNOR TO THE GENERAL AUTOMATIC SCALE COMPANY, OF ST. LOUIS, MISSOURI, A CORPORATION OF MISSOURI.

WEIGHING SCALE.

Application filed January 12, 1921. Serial No. 436,691.

*To all whom it may concern:*

Be it known that I, HARRY C. SCHAPER, a citizen of the United States, residing at St. Louis, Missouri, have invented a certain new and useful Improvement in Weighing Scales, of which the following is a full, clear, and exact description, such as will enable others skilled in the art to which it appertains to make and use the same, reference being had to the accompanying drawings, forming part of this specification.

This invention relates to new and useful improvements in weighing scales, the object being to provide a scale, the supporting parts of which are adjustable independently of each other whereby the scale can be adjusted to properly and accurately register the weight of the load placed on the weighing platform.

Other objects are to suspend and support the weighing platform so that any sidewise movement of the platform will not disturb the bearings and impair the accuracy of the scale; to provide bearings for the spider or platform carrying frame in which the friction is reduced to minimum and which bearings are adjustable independently of each other so that the platform-carrying frame and the weighing platform can be maintained in proper position.

A further object is to provide a yielding connection interposed between the weighing platform and the spider, which yielding connection or support will absorb any shocks or jars to which the weighing platform may be subjected thereby protecting the bearings of the scale from strain and wear, to which the bearings would be subjected through jars or excessive movement of the platform and which would affect the efficient operation of the scale.

With the foregoing and other objects in view, my invention consists in certain features of construction and arrangements of parts, hereinafter more fully described and claimed, and illustrated in the accompanying drawings, in which—

Figure 1 is a front elevation of the scale;

Figure 2 is a horizontal cross section of the housing of the scale and parts supported therein;

Figure 3 is a longitudinal cross-section taken on line 3—3 of Figure 2;

Figure 4 is a transverse section taken on the line 4—4 of Fig. 2;

Figure 5 is a detail cross-section taken on line 5—5 of Figure 2;

Figure 6 is an enlarged vertical cross-section of one of the bearings used for supporting the spider.

Referring by numerals to the accompanying drawings, 10 indicates the base or housing of boxlike structure provided with a large opening 11 at the top and having a removable bottom plate 12. The side walls of the housing 10 are provided with inwardly projecting and vertically disposed lugs 13. In these are formed vertically disposed apertures or openings 14 having their lower portions threaded as indicated at 15 to engage adjustable plugs or screws 16. The lower ends of bearings 17 enter the upper ends of apertures 14 and rest upon plugs 16. The upper ends of bearings 17 are provided with bearing blocks 18 having V-shaped grooves in their upper faces. Blocks 18 are preferably made of hardened metal and are retained in position in bearings 17 by means of pins 18ª. Resting in V-shaped grooves of blocks 18 are knife-edged blocks 19, which are seated in the underfaces of the ends of levers 20 and 21.

Lever 20 is transversely disposed in the front end of housing 10 and lever 21, which is parallel to lever 20, is similarly disposed in the rear part of housing 10. Projecting laterally and inwardly from levers 20 and 21 at points adjacent to their ends, are horizontally disposed arms 22 and 23, respectively, in the ends of which are seated upwardly projecting knife-edged bearing blocks 24. These knife-edged blocks 24 engage the V-shaped grooves formed in bearing blocks 25 which are carried by the upper ends of loops 26.

The spider or platform-carrying frame 27, which is preferably of rectangular shape, occupies a position within the opening 11 in the top of housing 10. Depending from the corners of said frame are stirrups 28, each stirrup straddling the end of the corresponding arm 22, or 23, and loop 26 which is suspended from said arm. The lowermost portion of each stirrup is provided with bearings 29 having a conical socket or seat 29ª in the underside. (See Figure 6.) Arranged to rest in said conical socket or seat is the convex portion of a semispherical bearing member 30, supported in position by rod 31. This rod 31 passes through centrally arranged openings in sleeve 29 and stirrup 28 and its upper end is hooked over the lower end of loop 26. These openings in sleeves 29 and stirrups 28 are of sufficient size to permit oblique movement of rod 31 without binding.

The lower end of rod 31 is threaded, as indicated at 31ª, and the semispherical bearing 30 is supported on said rod by means of nut 32 and lock nut 32ª. Bearings 30 and rods 31 are in vertical alinement with blocks 25 carried by loops 26 and knife-edged block 24 carried by arms 22 and 23 and support spider 27 in position on levers 20 and 21. By this arrangement, semispherical bearings 30 carried by rods 31 and supported in position by levers 20 and 21, through their respective arms 22 and 23, and corresponding loops 26, constitute a four-point support for spider 27 and each one of these points of support is adjustable independently of the others by the turning of nuts 32 and lock nuts 32ª in proper direction, thereby raising or lowering the semispherical bearing 30 on which the stirrups 28 of spider 27 are supported.

In order to prevent lengthwise movement of levers 21 and 22 in the V-shaped grooves of blocks 18, plates 33 are removably secured to the outer ends of bearings 17, which plates are arranged to engage the ends of knife-edged blocks 19 and thereby prevent end thrust of levers 20, 21.

Projecting laterally and rearwardly from lever 20 is a horizontal arm 34 having a downwardly curved portion 35 where said arm passes under the lever 21 so as to clear said lever. The free end of arm 34 is provided with a horizontal extension 36 which is adjustable by screw 37 carried by said extension and whose end is arranged to impinge upon a portion of arm 34. Extension 36 is designed to be locked in its adjusted position by nut 38. The outer end of extension 36 is provided with a bearing pin 39 which rests in bearing 40 in loop 41, and the latter is carried by the lower end of a vertically disposed rod 42, which enters housing 10 through an opening 11ª formed in the top of the rear portion of housing 10. The upper end of rod 42 is connected to a scale beam 43 supported in the rear portion of housing 10 by a standard 44. (See Figure 1.)

Horizontal arm 34 is provided with bearing blocks 47 having V-shaped grooves in their upper faces and located on each side of opening 34ª which opening is formed in said arm midway between the levers 20 and 21. Projecting forwardly from lever 21 and towards lever 20 are horizontal arms 45. The ends of said arms are united by an inverted L-shaped extension 46 which projects upwardly through opening 34ª and is supported on arm 34 and by knife-edged bearing blocks 48 resting in grooved blocks 47.

Spider 27 is provided with recesses or pockets 27ª which are in vertical alinement with rods 31 and bearing blocks 24 and 25. Coiled springs 50 are located in each recess and form a yielding support for the weighing platform 51, the latter having downwardly extending lugs 52, which fit into recesses 27ª in spider 27, and rest on top of springs 50.

Lugs 52 are provided at their lower ends with projections or pins 52ª which are adapted to rest on the bottom of recesses 27ª, when a load sufficient to overcome springs 50 is placed on the weighing platform, so that the weight of the load is at all times transmitted from the weighing platform to the spider at points which are in vertical alinement with the spider-supporting means, namely sleeves 29, semispherical bearings 30, rods 31 and the knife-edged bearing-blocks 24 and 25. The lever supporting bearings 18 and 19, the spider-supporting bearings 24 and 25, bearings 47 and 48, and bearings 39 and 40 are located on the same horizontal plane, and levers 20 and 21 and arms 34 and 45 are so shaped that the weight of the said levers and arms is below this horizontal plane, thereby justly stabilizing the structure and distributing the weight properly among the bearings, an arrangement which provides uniform wear of the bearings and insures accuracy of the operation of the scale. Arm 34 is provided with pads 53, to which a level can be applied in order to properly adjust the scale.

When a load is placed on the weighing platform 51, platform 51 and spider 27 move downwardly, thereby causing levers 20 and 21 through their connections with the stirrups 28 of said spider, to rock in their bearings. Horizontal arm 34, being connected to lever 20 and having operative connections with lever 21 through arms 45, moves downwardly a distance depending upon the weight placed upon platform 52, and actuates beam 43 or other indicating mechanism by rod 42.

In order to adjust levers 20 and 21 threaded plugs 16 in lugs 12 are manipulated to raise or lower bearings 17 until levers 20 and 21 and arms 34 and 45 and their respective bearings are all in proper alinement. The adjustment of the weighing platform 52 is accomplished by raising or lowering semispherical bearing members 30 on rods 31 by means of nuts 32. By making semispherical bearings 30 independently adjustable of each other, the points of support for the platform can be adjusted so that the weight is equally distributed to all of the bearings 30 of spider 27 and equally transmitted to the bearings of the scale, so that the bearings are protected from unequal strains and friction. The yielding means interposed between the weighing platform and the spider or platform supporting member serve as shock absorbers, whereby any jars or shocks imparted to the weighing platform, and which would injure the bearings or otherwise disturb the accuracy of the scale, are absorbed by the yielding means.

By virtue of the use of semispherical bearings 30 in cone-shaped bearing 29, bearings are provided in which the friction is reduced to minimum and the weighing platforms 52 and 27 are permitted movement in the horizontal plane without displacing or injuring any of the parts of the scale or affecting the efficient operation of it.

A weighing scale of my improved construction is comparatively simple, is capable of being readily adjustable so as to insure accuracy in operation, and is very effective in performing its intended functions.

It will be readily understood that minor changes in the size, form and construction of the various parts of my improved weighing scale can be made and substituted for those herein shown and described without departing from the spirit of my invention, the scope of which is set forth in the appended claims.

What I claim is:

1. In a weighing scale, a housing, a pair of levers supported in said housing and adapted to operate weight indicating mechanism, a spider frame suspended from said levers and having its points of suspension on a horizontal plane with the fulcrums of said levers, a weighing platform supported on said spider frame, and means mounted in said housing for adjusting said levers in vertical plane.

2. In a weighing scale, the combination with the beam scale, of a housing, adjustable bearings in said housing, a pair of interengaged levers supported in said bearings and connected to said beam, a spider frame flexibly suspended from said levers and having its points of support on a horizontal plane with the operating points of said levers, and a weighing platform supported on said spider.

3. In a weighing scale, the combination of its beam, of a housing, adjustable bearings in said housing, a pair of levers fulcrumed in said bearings and connected to said beam, a spider frame, means suspended from said levers and having flexible connection with said spider frame, the points of suspension of said means being on the same horizontal plane with the fulcrums of said levers, a weighing platform supported on said spider, and means for adjusting said bearings.

4. In a weighing scale, the combination with its beam, of a housing, a pair of levers supported in said housing and having operative connections with said beam, a spider frame having an adjustable ball and socket suspension connection with said levers, and a weighing platform supported on said spider.

5. In a weighing scale, the combination with its beam, of a housing, a pair of levers supported in said housing and having operative connections with said beam, a spider frame adjustably suspended from said levers, a weighing platform supported on said spider, and means for adjusting said spider frame in vertical plane.

6. In a weighing scale, the combination with its beam, of a housing, a pair of levers supported in said housing and having operative connection with said beam, a spider frame, a weighing platform supported on said spider frame, and means for suspending said spider frame from said levers, said means having a universal joint connection, whereby said spider frame and the weighing platform are movable in horizontal plane.

7. In a weighing scale, the combination with its beam, of a housing, a pair of levers supported in said housing and having operative connections with said beam, a spider frame, a weighing platform supported on said spider frame and means suspended from said levers and having a convex bearing surface upon which said spider frame is supported.

8. In a weighing scale, the combination with its beam, of a housing, a pair of levers supported in said housing and having operative connections with said beam, a spider frame having depending members provided with conical sockets, a weighing platform supported on said spider frame, and spherical bearings suspended from said levers and adapted to operate in said conical sockets and support said spider frame.

9. In a weighing scale, the combination with its beam, of a housing having inwardly projecting lugs, vertically adjustable means disposed in said lugs, bearings supported in said lugs by said adjustable means, a pair of levers supported by said bearings and connected to said beam, a spider frame adjustably suspended from said levers and a weighing platform carried by said spider frame.

10. In a weighing scale, a housing, a pair of horizontal levers adjustably mounted therein and having laterally projecting arms, a spider frame having downwardly presented loops which straddle said arms, suspension means having ball and socket connections with said loops and a knife-edge connection with said arms, and a weighing platform yieldingly supported on said spider frame.

11. In a weighing scale, a housing provided with bearings, a pair of horizontal levers adjustably mounted in said bearings, a pair of short arms projecting laterally from each lever and provided with bearings, a spider frame adjustably supported on the last mentioned bearings, a long arm projecting laterally from one of said levers and having an extensible bearing at its end adapted to engage a member having operative connection with a scale beam, a short arm projecting from the other one of said levers and having a bearing in said long arm, all of said bearings being arranged in the same horizontal plane.

12. In a weighing scale, the combination with a scale beam, of a housing, a pair of horizontal levers adjustably mounted in said housing and operatively connected to said scale beam, a spider frame adjustably supported from said levers, a weighing platform supported on said spider frame and yielding means interposed between said spider frame and said platform.

13. In a weighing scale, the combination with a scale beam, of a housing, a pair of horizontal levers adjustably mounted in said housing and operatively connected to said scale beam, a spider frame adjustably supported from said levers and provided with recesses at its top, springs positioned in said recesses, and a weighing platform having lugs arranged to enter the recesses in said spider frame and rest on said springs.

14. In a weighing scale, a housing, a pair of horizontal levers adjustably mounted in said bearing and having laterally projecting arms, a spider frame having a plurality of adjustable supports for supporting said spider frame from said arms, said supports being adjustable in vertical plane independently of each other, and a weighing platform carried by said spider frame.

In testimony whereof I hereunto affix my signature this 5th day of January, 1921.

HARRY C. SCHAPER.